(12) United States Patent
Grillmeier et al.

(10) Patent No.: US 8,667,985 B2
(45) Date of Patent: Mar. 11, 2014

(54) PRESSURE RELIEF VALVE AND VENT ASSEMBLY

(75) Inventors: David Grillmeier, Gateshead (AU); Joshua Jeffress, Gateshead (AU); Adam Peattie, Gateshead (AU)

(73) Assignee: Walnab Pty Ltd (AU)

( * ) Notice: Subject to any disclaimer, the term of this patent is extended or adjusted under 35 U.S.C. 154(b) by 202 days.

(21) Appl. No.: 13/060,470

(22) PCT Filed: Aug. 25, 2008

(86) PCT No.: PCT/AU2008/001248
§ 371 (c)(1),
(2), (4) Date: May 18, 2011

(87) PCT Pub. No.: WO2010/022431
PCT Pub. Date: Mar. 4, 2010

(65) Prior Publication Data
US 2011/0214759 A1    Sep. 8, 2011

(51) Int. Cl.
*F16K 17/26* (2006.01)
(52) U.S. Cl.
USPC ........................... 137/493.8; 137/589
(58) Field of Classification Search
USPC ............. 137/389, 493.8, 587, 202, 589, 545, 137/549, 493.7; 220/745, 747; 96/189, 190, 96/159
See application file for complete search history.

(56) References Cited

U.S. PATENT DOCUMENTS

| | | | | |
|---|---|---|---|---|
| 1,807,200 A * | 5/1931 | Dennison et al. | | 137/545 |
| 2,784,801 A * | 3/1957 | Lunde | | 55/482 |
| 3,048,958 A * | 8/1962 | Barnes | | 137/587 |
| 3,225,696 A * | 12/1965 | Brigman | | 137/211 |
| 3,231,182 A * | 1/1966 | Downey | | 137/557 |
| 3,678,881 A * | 7/1972 | Shinn | | 137/556 |
| 3,818,929 A | 6/1974 | Braukmann | | |
| 4,478,238 A * | 10/1984 | Maddox et al. | | 137/549 |
| 4,889,160 A * | 12/1989 | Sheets | | 137/588 |
| 5,308,386 A | 5/1994 | Wilkes | | |
| 5,358,009 A * | 10/1994 | Cambell | | 137/899 |
| 2004/0011401 A1 | 1/2004 | Kato | | |
| 2010/0199844 A1* | 8/2010 | Hilberer | | 96/189 |

FOREIGN PATENT DOCUMENTS

GB           941515         11/1963

OTHER PUBLICATIONS

International Search Report for International Application No. PCT/AU2008/001248 dated Nov. 10, 2008.
International Preliminary Report on Patentability for International Application No. PCT/AU2008/001248 dated Sep. 29, 2010.

* cited by examiner

*Primary Examiner* — Craig Schneider
*Assistant Examiner* — Craig J Price
(74) *Attorney, Agent, or Firm* — Levenfeld Pearlstein, LLC

(57) ABSTRACT

A pressure relief valve and vent assembly include a tank vent including: (i) a vent body having a vent inlet adapted to connect to a tank and arranged to communicate with an exhaust outlet via a fluid passageway; (ii) an exhaust check valve connected to the vent body at or adjacent the exhaust outlet, the exhaust check valve being configured to allow flow in one direction only; and (iii) a pressure relief valve connected to the tank vent inlet and adapted to couple to a tank. The pressure relief valve, when closed, allows for venting air or air/hydrocarbon mixtures from the tank to the exhaust check valve via the fluid passageway. The pressure relief valve, when opened on pressurization of the tank, exhausts tank fluid from the exhaust check valve.

12 Claims, 6 Drawing Sheets

PRESSURE RELIEF VALVE AND VENT ASSEMBLY

FIELD OF THE INVENTION

The present invention relates broadly to a pressure relief valve and vent assembly and relates particularly, although not exclusively, to a tank vent.

BACKGROUND OF THE INVENTION

The industry standard method of refuelling large diesel powered equipment in the mining, railway, and earthmoving industries has incorporated dry-break fluid couplings designed to transfer diesel fuel from a dispensing point into the fuel tank onboard the equipment. An integral component of this system is the specialised vent fitted to the tank being refuelled. This vent fulfils a number of key roles, including:

Free discharge of air from the tank during the refuelling process, at fuel levels under the level at which the vent valve is closed.

Closure of the main vent passage once the fuel level within the tank reaches a certain level on the vent. This essentially seals the tank allowing it to be pressurised as fuel continues to enter the tank.

Free-to-air passage of pressurised air from within the tank to atmosphere via a bleed hole within the vent, allowing the tank to gradually depressurise at the completion of the refuelling process.

Discharge of pressurised air and fuel from the tank through an emergency pressure relief valve within the vent, in the event the tank becomes over-pressurised.

Free intake of air into the tank through the vent as fuel is drawn from the tank.

The equipment or tanks onto which such refuelling equipment is installed includes mining equipment, and other plant used in dirty and dusty environments. Recent research by a number of large mining companies and engine manufacturers has identified the many advantages in maintaining stringent standards of contamination control of fuel, oils, and other vital fluids. One of the key routes for contamination Ingress into a fluid is via the tank vent. Typically such vents have incorporated no air filtering mechanism, although this practice is steadily changing as contamination control strategies are enforced.

The basic function of the vent in the refuelling process remains the same as quick-fill vents used within the market for many years now, such as that detailed in the applicant's Australian patent no.s 586028 and 726581.

With respect to the fitment of air filtration to these quick-fill vents, mining equipment OEM's have installed remote mounted air filters and desiccant elements to tank vents to remove airborne contaminants and moisture from air entering the tank. However these systems do not offer the level or degree of filtration necessary to comply with modern contamination control standards, i.e. the micron rating of the air filters is too coarse. In response to more stringent filtration standards, filtered vents have been introduced onto the market, which incorporate a "spin-on" style generic air filter element which offered the degree of filtration necessary. It is understood that all incoming and outgoing air passes through the filter element, whereas air and fuel exhausted from the integral pressure relief valve, bypasses the filter element. Further, the intake ports of the filter element are directly exposed to the atmosphere, and thus exposed to rainfall and wash-down water.

SUMMARY OF THE INVENTION

According to one aspect of the present invention there is provided a pressure relief valve and vent assembly comprising:

a pressure relief valve adapted to couple to a tank; and
a tank vent operatively coupled to the pressure relief valve, the tank vent comprising
a vent body including a vent inlet arranged to communicate with an exhaust outlet via a fluid passageway;
an exhaust check valve connected to the vent body at or adjacent the exhaust outlet, the exhaust check valve being configured to allow fluid flow through the fluid passageway in one direction only from the tank to atmosphere via the vent inlet and the exhaust outlet.

Preferably the pressure relief valve is integral with the tank vent, More preferably the pressure relief valve includes one or more float elements arranged to co-operate with a reciprocating vent tube located at least in part within the fluid passageway. Even more preferably the relief valve also includes biasing means designed to urge the reciprocating vent tube into seated engagement with the vent body while still allowing fluid to vent through said tube. Still more preferably an uppermost of the float elements is arranged to block the vent tube when the tank is substantially full whereby pressurisation of the tank actuates the relief valve to unseat the vent tube from the vent body and to allow fluid to exhaust the tank via the exhaust outlet.

According to another aspect of the invention there is provided a tank vent comprising:

a vent body adapted to couple to a tank, the vent body including a vent inlet arranged to communicate with an exhaust outlet via a fluid passageway;
an exhaust check valve connected to the vent body at or adjacent the exhaust outlet, the exhaust check valve being configured to allow fluid flow through the fluid passageway in one direction only from the tank to atmosphere via the vent inlet and the exhaust outlet.

Preferably the vent body also includes an ambient air inlet in fluid communication with the fluid passageway and arranged to permit the flow of ambient air from atmosphere into the tank via the fluid passageway. More preferably the tank vent also comprises a filter element operatively coupled to the vent body at or adjacent the ambient air inlet.

Preferably the tank vent further comprises an ambient air inlet check valve connected to the vent body at or adjacent the ambient air inlet, the inlet check valve being configured to allow air flow in one direction only from atmosphere to the fluid passageway via the air inlet. More preferably the inlet check valve is located downstream of the filter element and includes a check valve head coupled to biasing means urging the valve head into a normally closed position, the inlet check valve being opened by vacuum pressure in the fluid passageway to permit air flow into the tank. Even more preferably the inlet check valve is in the form of a poppet valve wherein the biasing means includes a compression or poppet spring.

Preferably the tank vent additionally comprises a strainer operatively coupled to the vent body adjacent and upstream of the filter element. More preferably the tank valve further comprises a labyrinth located between the strainer and the filter element. Even more preferably the tank vent additionally comprises a filter condition indicator located between the filter element and the inlet check valve.

BRIEF DESCRIPTION OF THE FIGURES

In order to achieve a better understanding of the nature of the present invention a preferred embodiment of a pressure relief valve and vent assembly will now be described, by way of example only, with reference to the accompanying drawings in which.

DETAILED DESCRIPTION OF THE PREFERRED EMBODIMENT

Figure 1:
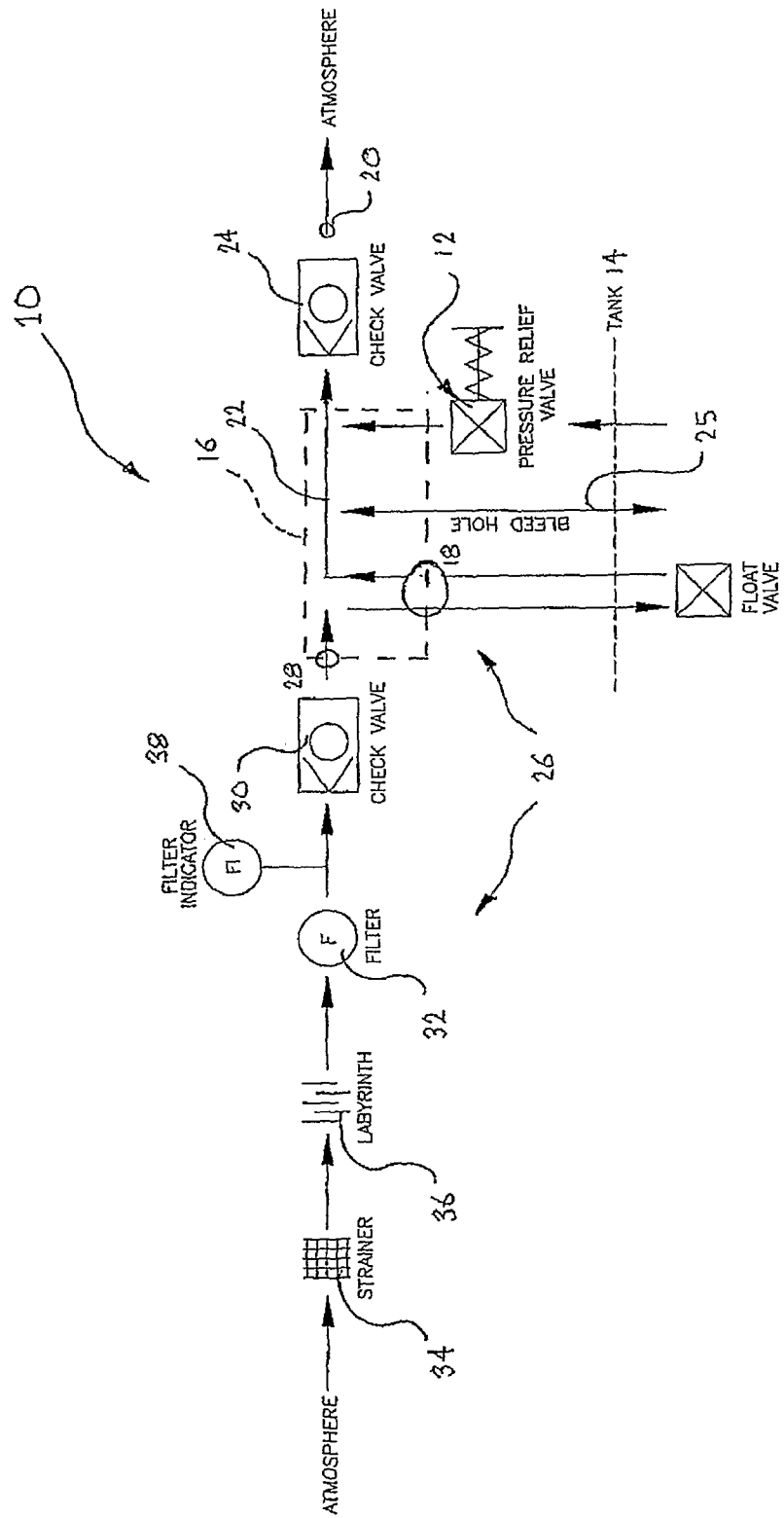
FIG. 1 is a schematic flow diagram of an embodiment of a pressure relief valve and vent assembly according to the invention.

FIG. 1 is a schematic flow diagram of the fluid and ambient air flow through a pressure relief valve and vent assembly 10 of one embodiment of the present invention. The pressure relief valve and vent assembly 10 comprises:

1. A pressure relief valve 12 adapted to couple to a tank 14; and
2. A tank vent designated generally as 26 comprising:
   (a) A vent body shown schematically in hidden detail as the rectangular boxed section 16 having a vent inlet shown circled at 18 and an exhaust outlet shown circled at 20 and being in communication with each other via a fluid passageway 22;
   (b) An exhaust check valve 24 connected to the vent body 16 at the exhaust outlet 20.

The tank vent 26 is operatively coupled to the pressure relief valve 12 and in this embodiment they are integrated to form an integrated pressure relief valve and vent assembly 10.

The exhaust check valve 24 is configured to allow fluid to flow through the fluid passageway 22 in one direction only from the tank 14 to atmosphere via the vent inlet 18 and the exhaust outlet 20. The tank vent 26 also includes a bleed hole 25 which allows for normal breathing of the vent 26 via the exhaust outlet 20 and the check valve 24.

The pressure relief valve and vent assembly 10 of this embodiment also includes an ambient air inlet shown circled at 28 in fluid communication with the fluid passageway 22. The ambient air inlet 28 is arranged to permit the flow of ambient air from atmosphere into the tank 14 via the vent inlet 18. The tank vent 26 further comprises an ambient air inlet check valve 30 connected to the vent body 16 at the ambient air inlet 28. The inlet check valve 30 is configured to allow air flow in one direction only from atmosphere to the tank 14 via the air inlet 28.

In this embodiment the tank vent 26 also comprises a filter element 32 operatively coupled to the vent body 16 adjacent to the ambient air inlet 28 and upstream inlet check valve 30. The inlet check valve 30 is designed so that it is opened by vacuum pressure in the fluid passageway 22 to permit air flow into the tank 14 via the ambient air inlet 28.

The tank vent 26 of this embodiment additionally comprises a strainer 34 operatively coupled to the vent body 16 adjacent and upstream of the filter element 32. A labyrinth 36 is in this example located between the filter element 32 and the strainer 34. The tank vent 26 also comprises a filter condition indicator 38 located between the inlet check valve 30 and the filter element 32.

The various components of the pressure relief valve and vent assembly 10 are designated with the same reference numerals as the corresponding components from the flow diagram of FIG. 1. Having said that, some of the components are internal to the pressure relief valve and vent assembly 10 and thus can not be seen in FIG. 2.

Figure 3:
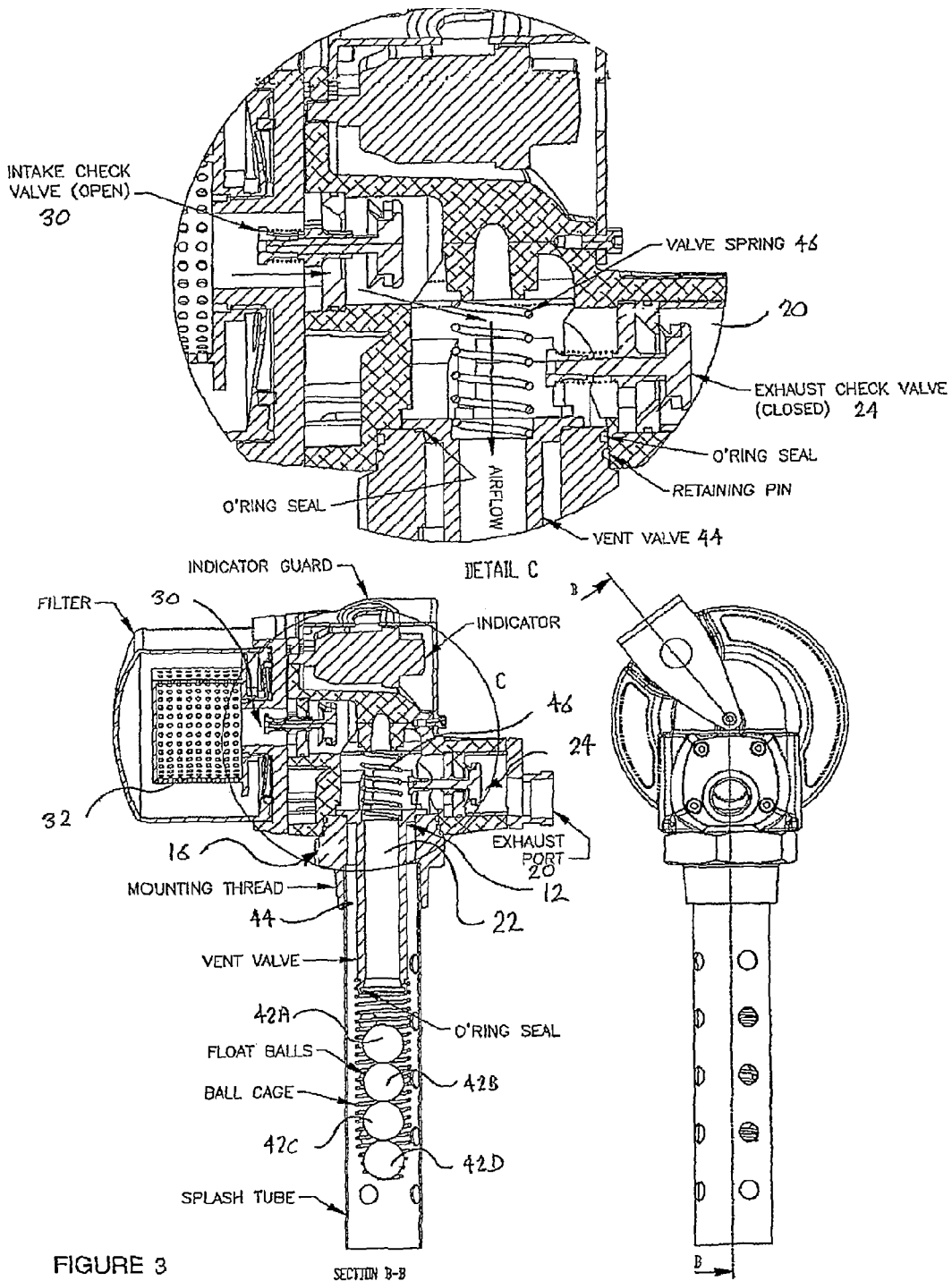
FIG. 3 is elevational, sectional and detailed views of the pressure relief valve and vent assembly of FIG. 2.

FIG. 3 more clearly depicts the various components of the pressure relief valve and vent assembly 10 with the exhaust check valve 24 closed and the inlet check valve 30 opened. For this and subsequent figures the corresponding components from the previous figures are designated with the same reference numerals.

The pressure relief valve 12 of this embodiment includes one or more float elements or float balls such as 42A to 42D arranged to co-operate with a reciprocating vent tube 44 located at least in part within the fluid passageway 22. The relief valve 12 includes biasing means such as compression spring 46 designed to urge the vent tube 44 into seated engagement with the vent body 16. As shown in FIG. 1, with the pressure relief valve 12 in its closed condition, ambient air and fluid are allowed to pass through the vent tube 44 in both directions. If the tank is substantially full, the uppermost of the float elements 42A will block the vent tube 44 causing pressurisation of the tank 14. If, for example, during refuelling the tank 14 over pressures the vent tube 44 overcomes the biasing force of the compression spring 46 and is unseated from the vent body 16. In these circumstances the tank fluid is exhausted from the tank 14 via the exhaust check valve 24 and the exhaust outlet 20.

It will otherwise be understood that as shown in FIG. 3, ambient air entering the tank 14 must pass through at least the fitter element 32 which is operatively coupled to the ambient air inlet 28 and check valve 30. It should also be understood that ambient air cannot enter the fluid passageway 22 via the exhaust outlet 20 (and thus bypass the filter element 32) because the exhaust check valve 24 is normally closed and prevents this. The intake check valve 30 is actuated or operated by a relatively low differential pressure, such as around 2 to 3 kPa, induced by vacuum within the fluid passageway 22 on for example emptying of the tank 14.

Figure 4:
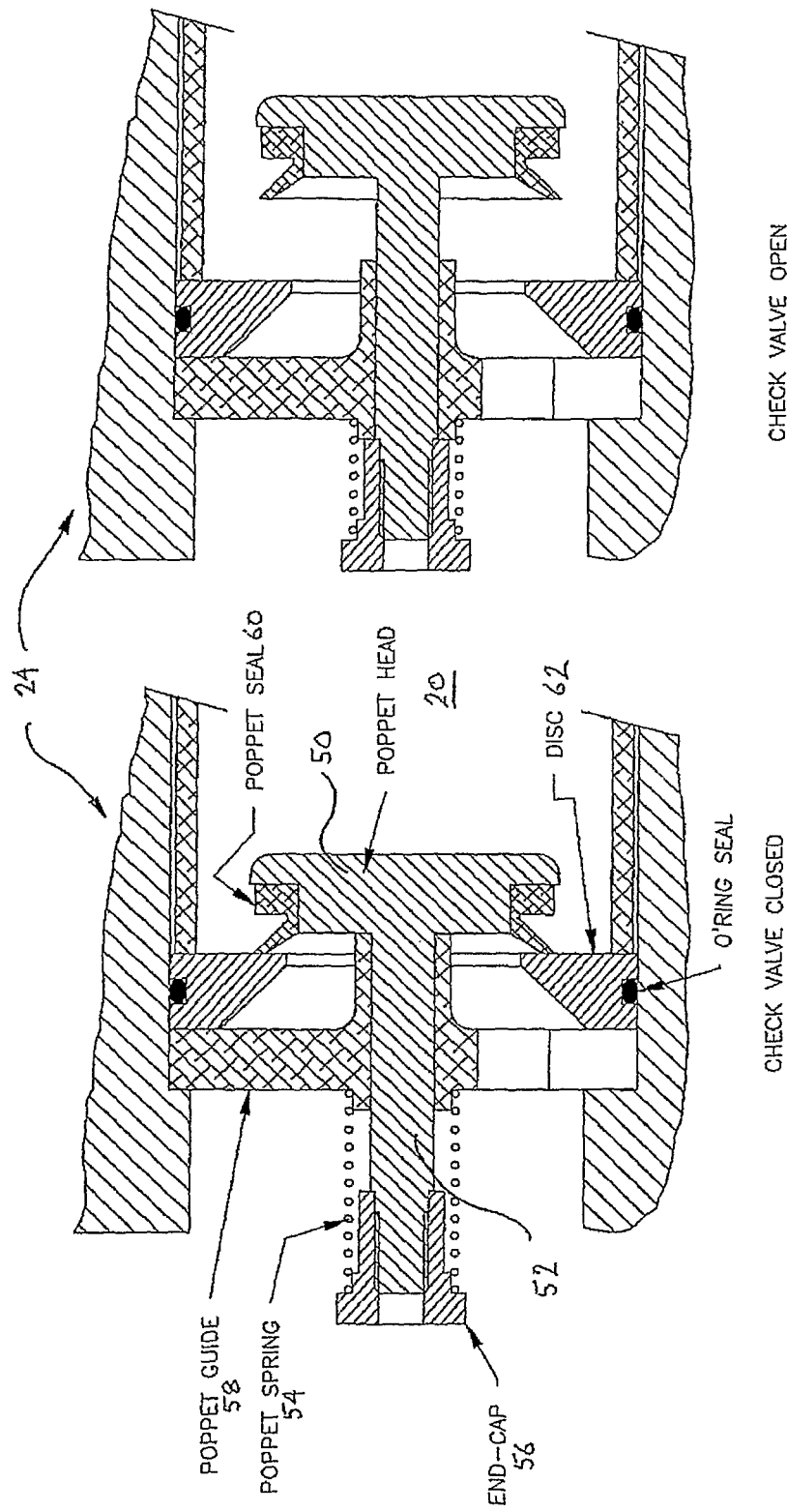
FIG. 4 are detailed sectional views of the exhaust check valve taken from FIG. 3 and shown in its closed and open conditions, the Intake check valve being of a substantially identical construction.

As best shown in FIG. 4, the exhaust check valve 24 includes a check valve head 50 formed integral with a valve stem 52. The check valve 24 includes biasing means in the form of a poppet spring 54 arranged to urge the valve head 50 into its normally closed position. In this embodiment the poppet spring 54 at its opposing ends bears against an end cap 56 connected to a free end of the valve stem 52 and a valve guide 58 located coaxially within the exhaust outlet 20, respectively.

The exhaust check valve 24 is normally closed (as shown on the left hand side) during the intake of ambient air from the vent inlet 28 whereas pressurisation of the fluid passageway 22 forces opening of the exhaust check valve 24 against the spring 54 closure force (as shown on the right hand side). The exhaust check valve 24 also includes a seat 60 located about a perimeter of the valve head 50 and designed to provide sealing closure of the check valve 24 with a disk 62 located coaxially with and abutting with the valve guide 58. It will be appreciated from the detailed sectional view of FIG. 3 that the intake check valve 30 is of the same construction and normally-closed configuration as the exhaust check valve 24.

The exhaust check valve 24 is actuated or controlled by differential pressure, in this case greater than ambient pressure within the fluid passageway 22 for opening of the normally-closed check valve 24 at relatively low differential pressures, such as between 2 to 3 kPa.

Figure 6:
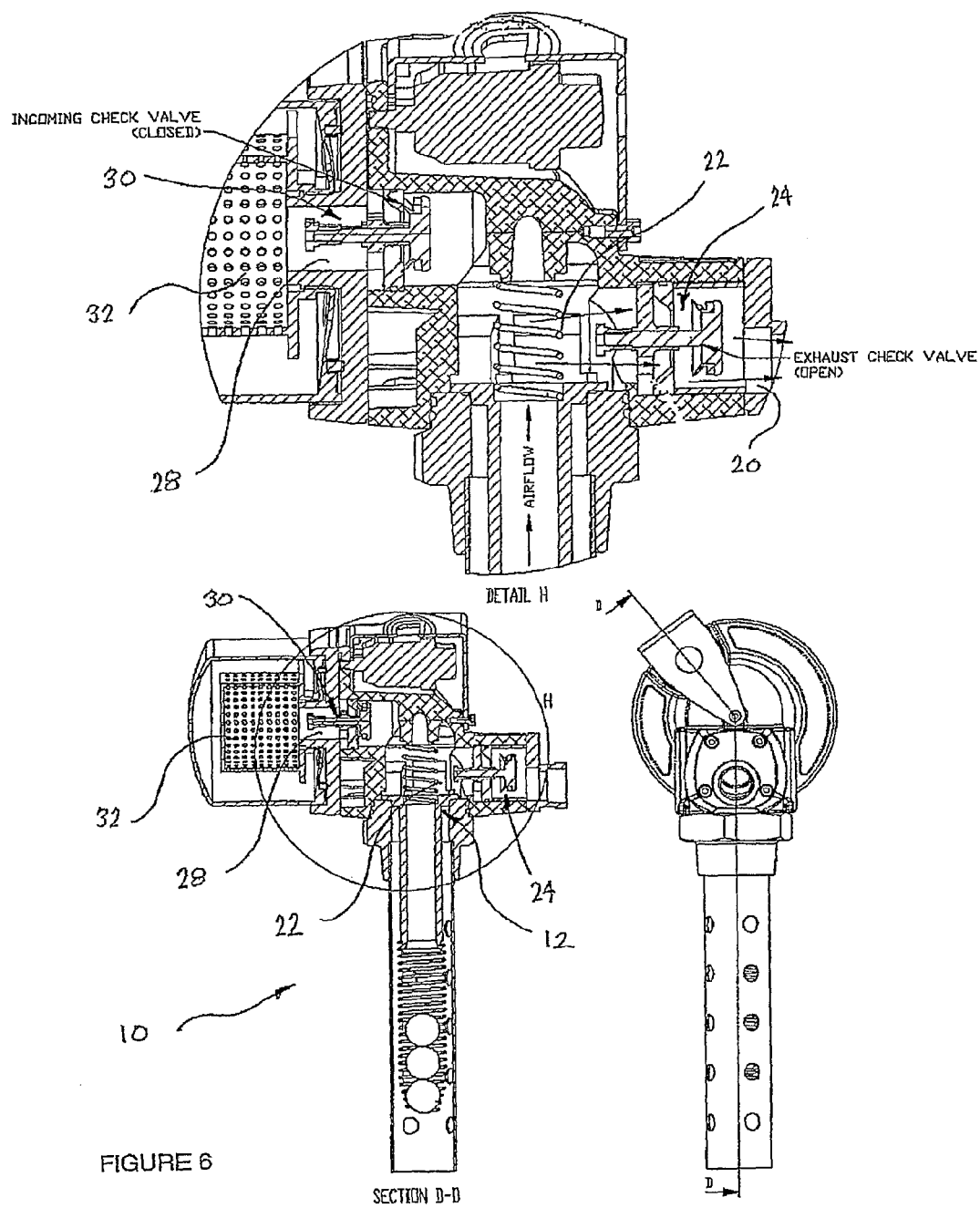
FIG. 6 is elevational, sectional and detailed view of the pressure relief valve and vent assembly of FIG. 3 but with the exhaust check valve opened and the intake check valve closed.

FIG. 6 illustrates the pressure relief valve and vent assembly 10 when venting fluid, typically air or air/hydrocarbon mixtures, during for example refuelling of the tank 14 with the pressure relief valve 12 closed. It will be apparent that all outgoing air or air/vapour from the tank 14 is routed through the exhaust check valve 24 and the fluid outlet 20. The inlet check valve 30 ensures that this outgoing air or air/vapour mixture bypasses the filter element 32 because the inlet check valve 30 is maintained closed. Similarly, although not illustrated, when the pressure relief valve 12 is opening all fluid, such as air, air/vapour, or air/vapour/fuel, is exhausted through the exhaust outlet 20 via the exhaust check valve 24. This opening of the exhaust check valve 24 and closure of the intake check valve 30 ensures once again that the outgoing fluid bypasses the filter element 32. In short, proper routing of incoming and outgoing flow is provided by the exhaust check valve 24 and intake check valve 30 which are controlled by differential pressure (either increased pressure or vacuum) across each check valve.

It is understood that performance and integrity of a filter element is affected if moisture enters the element, whether water or some other fluid. Therefore, at least in the preferred embodiment the pressure relief valve and vent assembly 10 minimises or at least reduces the opportunity for any moisture to enter the filter element 32. Whether through normal breathing of the vent, or from air and fuel exhausting from the pressure relief valve 12, all product discharged from the tank via the vent 26 bypasses the filter element 32 and exits via the exhaust port 20 and the check valve 24. Although under normal circumstances during the refuelling process, air freely exits the tank 14 via the vent 26, this air may contain fuel vapour/foam and some liquid fuel at times as the fuel approaches the level at which the vent 26 will be closed, particularly if the surface of the fuel is turbulent. Therefore, there is benefit in having all outgoing product bypass the filter element 32.

Figure 2:
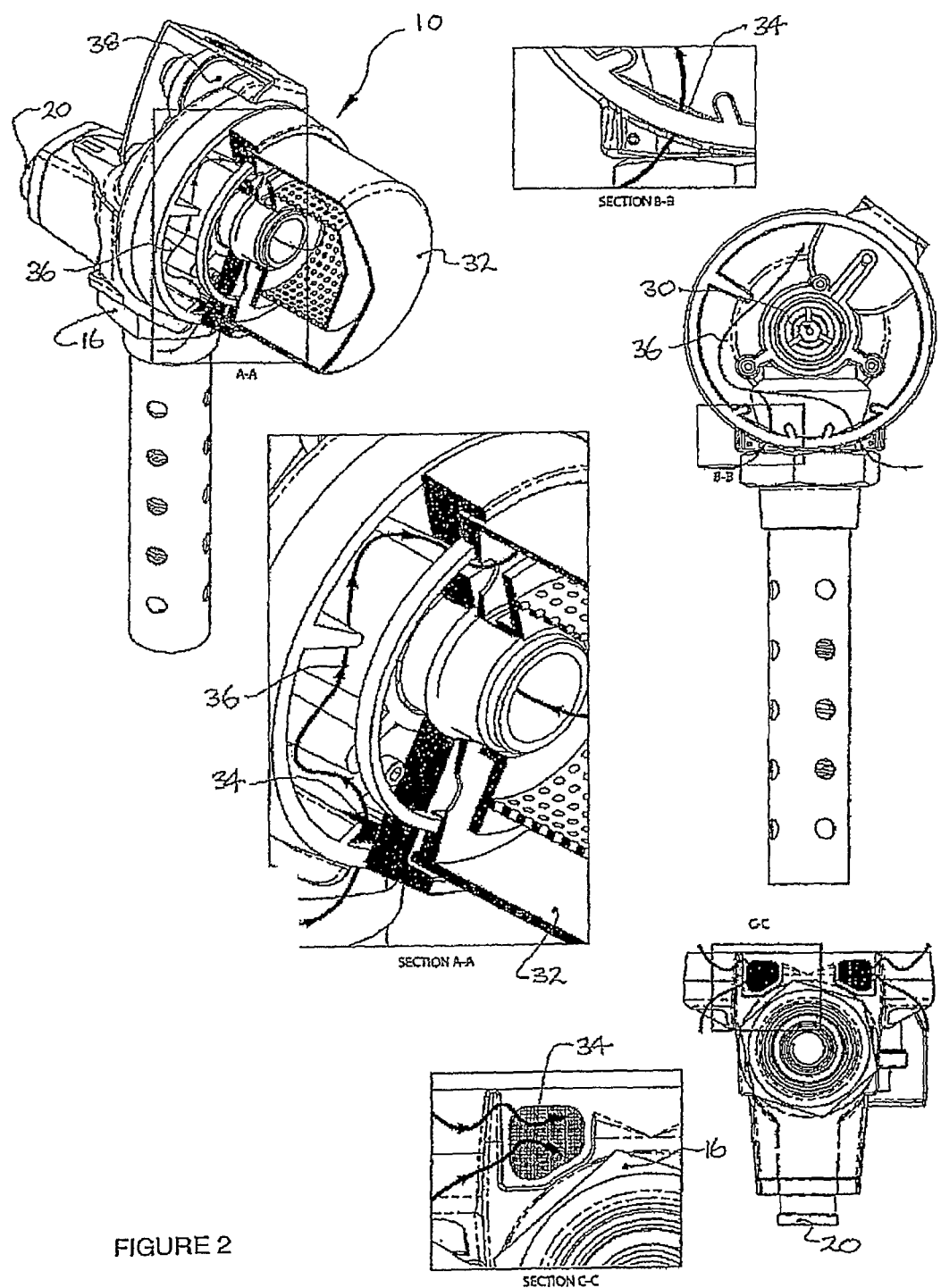
FIG. 2 is a perspective and other views of a pressure relief valve and vent assembly such as that conforming to the flow diagram of FIG. 1.
Figure 5:
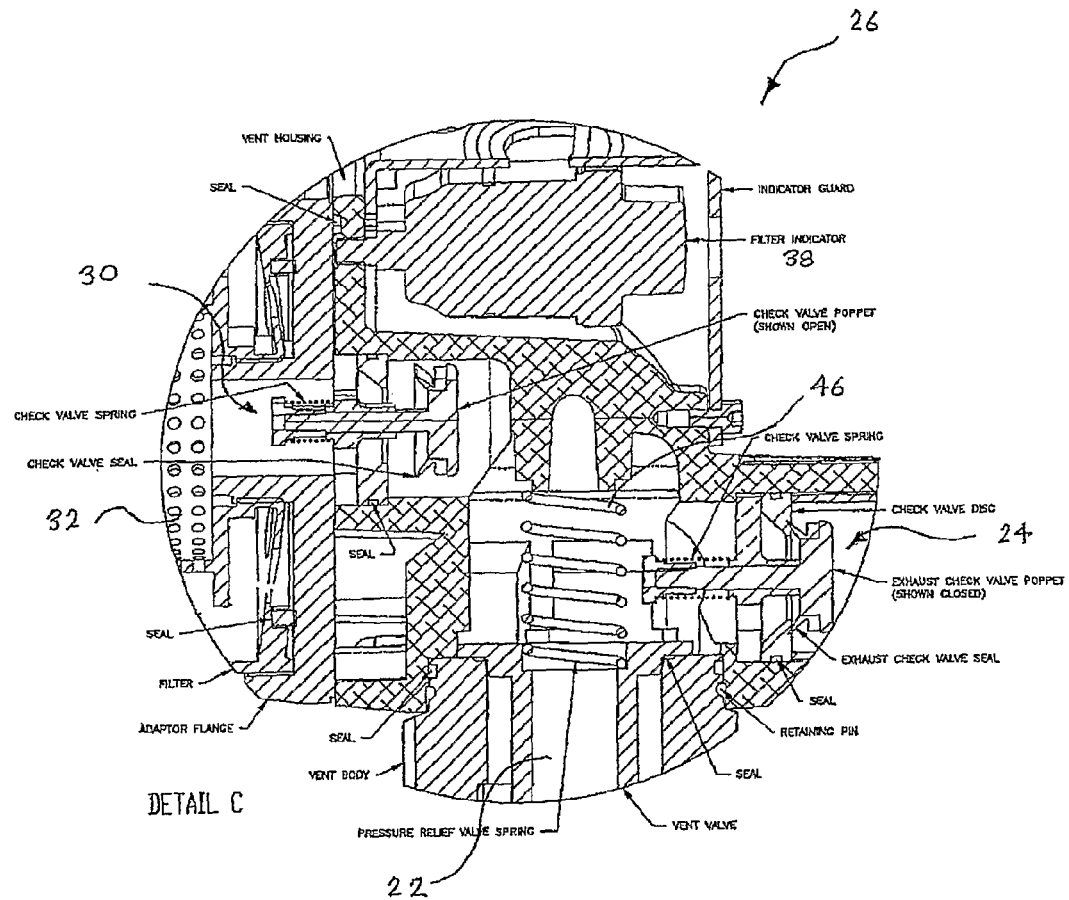
FIG. 5 is a detailed view taken from the pressure relief valve and vent assembly of FIG. 3.

As shown in FIG. 2 and in some cases the detailed view of FIG. 5 the tank vent 26 also includes the strainer in the form of a fine mesh gauze 34. The fine gauze stainer 34 is located upstream of the labyrinth 36 which in turn is located upstream of the filter element 32. Thus, ambient air entering the vent assembly 10 must first pass through the stainer 34 and the labyrinth 36 before passing into the filter element 32 and finally into the tank. This pathway reduces the amount of moisture that enters the filter element 32, even during rainfall and high pressure wash-down which is common practice on for example most mobile mining vehicles.

FIG. 5 also illustrates a filter condition indicator 38 which is located between the filter element 32 and the intake check valve 3D. The filter indicator 38 measures the degree of vacuum required to draw air through the filter element 32, which is proportional to the flow rate of air and the degree of resistance to this air flow through the filter element 32. The filter indicator 38 includes a piston with detent open (latch) position to retain the piston in the event that the maximum degree of vacuum is reached which indicates the resistance to the air flow through the filter element 32 has increased to a level at which the filter element 32 is excessively contaminated and requires replacement. Thus, by simply visually inspecting the filter indicator 38 to ascertain whether the detent position has been reached, the condition of the filter element 32 may be determined and replaced when necessary.

Those skilled in the art will appreciate that the invention described herein is susceptible to variations and modifications other than those specifically described. For example, the invention may be directed solely to the tank vent without a pressure relief valve. The tank vent need not have an intake check valve but rather the fluid passageway may be shaped to prevent fluid exiting via the incoming air filter element. Furthermore, the tank vent or assembly need not have the filter element or additional filtering components described. All such variations and modifications are to be consider within the scope of the present invention the nature of which is to be determined from the foregoing description.

The invention claimed is:

1. An integrated pressure relief valve and vent assembly comprising:
    a tank vent including:
    (i) a vent body including a vent inlet adapted to connect to a tank and arranged to communicate with an exhaust outlet via a fluid passageway of the vent body;
    (ii) an exhaust check valve connected to the vent body at or adjacent the exhaust outlet, the exhaust check valve being configured to allow flow through the fluid passageway in one direction only to atmosphere;
    (iii) an ambient air inlet separate from the exhaust outlet and arranged in fluid communication with the fluid passageway to permit the flow of ambient air from atmosphere into the tank via the fluid passageway and the vent inlet;
    (iv) a pressure relief valve connected to the vent body at the vent inlet, the pressure relief valve when closed allowing for venting air or air/hydrocarbon mixtures from the tank to the atmosphere via the fluid passageway and the exhaust check valve, the pressure relief valve when opened, on pressurisation of the tank, exhausting tank fluid from the exhaust check valve to the atmosphere via the pressure relief valve and the fluid passageway.

2. The integrated pressure relief valve and vent assembly as defined in claim 1 wherein the pressure relief valve includes a hollow vent tube operatively coupled to the vent inlet for venting air or air/hydrocarbon mixtures.

3. The integrated pressure relief valve and vent assembly as defined in claim 1 wherein the tank vent also comprises a filter element operatively coupled to the vent body upstream of the ambient air inlet.

4. The integrated pressure relief valve and vent assembly as defined in claim 3 wherein the tank vent further comprises an ambient air inlet check valve connected to the vent body at or adjacent the ambient air inlet, the inlet check valve being configured to allow air flow in one direction only from atmosphere to the fluid passageway via the ambient air inlet.

5. The integrated pressure relief valve and vent assembly as defined in claim 4 wherein the inlet check valve is in the form of a spring biased valve.

6. The integrated pressure relief valve and vent assembly as defined in claim 1, wherein the exhaust check valve is in the form of a spring biased poppet valve.

7. The integrated pressure relief valve and vent assembly as defined in claim 3 wherein the tank vent additionally comprises a strainer operatively coupled to the vent body adjacent and upstream of the filter element.

8. The integrated pressure relief valve and vent assembly as defined in claim 7 wherein the tank valve further comprises a labyrinth located between the strainer and the filter element.

9. The integrated pressure relief valve and vent assembly as defined in claim 3 wherein the tank vent additionally comprises a filter condition indicator located between the filter element and the inlet check valve.

10. The integrated pressure relief valve and vent assembly as defined in claim 2 wherein the pressure relief valve also includes one or more float elements arranged to co-operate with a lower end of the hollow vent tube.

11. The integrated pressure relief valve and vent assembly as defined in claim 10 wherein the hollow vent tube is arranged for reciprocating movement within the vent inlet and the pressure relief valve also includes biasing means designed to urge the reciprocating vent tube into seated engagement with the vent body while still allowing the air or air/hydrocarbon mixtures to vent through said vent tube.

12. The integrated pressure relief valve and vent assembly as defined in claim 11 wherein an uppermost of the float elements is arranged to block the lower end of the hollow vent tube when the tank is substantially full thereby pressurising the tank and actuating the pressure relief valve to unseat the vent tube from the vent inlet and to allow tank fluid to exhaust the tank via the exhaust outlet.

\* \* \* \* \*